(12) United States Patent
Hall

(10) Patent No.: US 11,090,734 B1
(45) Date of Patent: Aug. 17, 2021

(54) DOWEL JIG

(71) Applicant: Taylor James Hall, Palatine, IL (US)

(72) Inventor: Taylor James Hall, Palatine, IL (US)

(73) Assignee: Nomis LLC, Palatine, IL (US)

( * ) Notice: Subject to any disclaimer, the term of this patent is extended or adjusted under 35 U.S.C. 154(b) by 0 days.

(21) Appl. No.: 16/869,094

(22) Filed: May 7, 2020

(51) Int. Cl.
 *B23B 47/28* (2006.01)

(52) U.S. Cl.
 CPC .......... *B23B 47/288* (2013.01); *B23B 47/281* (2013.01); *Y10T 408/567* (2015.01)

(58) Field of Classification Search
 CPC .. B23B 47/287; B23B 47/288; Y10T 408/567
 See application file for complete search history.

(56) References Cited

U.S. PATENT DOCUMENTS

| | | | | |
|---|---|---|---|---|
| 1,269,811 | A * | 6/1918 | Heritage | H01L 23/49575 408/109 |
| 2,260,784 | A * | 10/1941 | Morton | B23B 47/288 408/103 |
| 2,470,038 | A * | 5/1949 | Long | B23B 47/288 408/109 |
| 3,708,237 | A * | 1/1973 | Kruse | B23B 47/288 408/108 |
| 4,377,357 | A * | 3/1983 | Butera | B23B 47/288 408/115 R |
| 4,594,032 | A * | 6/1986 | Warburg | B23B 47/288 408/115 R |
| 6,244,794 | B1 * | 6/2001 | Lindsay | B23B 47/288 408/103 |
| 6,398,465 | B1 * | 6/2002 | Monge | B23B 47/287 279/143 |
| 8,840,345 | B1 * | 9/2014 | Park | B23B 47/287 408/115 R |
| 9,370,828 | B2 * | 6/2016 | Adkins | B23B 47/288 |
| 9,969,042 | B2 * | 5/2018 | Clark | B23Q 11/0042 |
| 2018/0071835 | A1 * | 3/2018 | Poole | B23B 47/287 |

FOREIGN PATENT DOCUMENTS

| | | | | |
|---|---|---|---|---|
| WO | WO-8810177 | A1 * | 12/1988 | B23B 47/287 |
| WO | WO-2005023470 | A2 * | 3/2005 | B23B 47/288 |

\* cited by examiner

*Primary Examiner* — Eric A. Gates
(74) *Attorney, Agent, or Firm* — Reinhart Boerner Van Deuren P.C.

(57) ABSTRACT

A dowel jig having a main body, a clamp assembly and a drill guide is provided. The main body has first and second legs for locating a workpiece. The dowel jig may have a side stop for locating the workpiece in a third dimension. Drill guide spacers may be provided for locating the drill guide relative to the workpiece abutments provided by the main body. The clamp assembly may have locating features quick and repeatable adjustment of the location of the clamp for clamping workpieces for forming dowel holes in different portions of a workpiece.

15 Claims, 19 Drawing Sheets

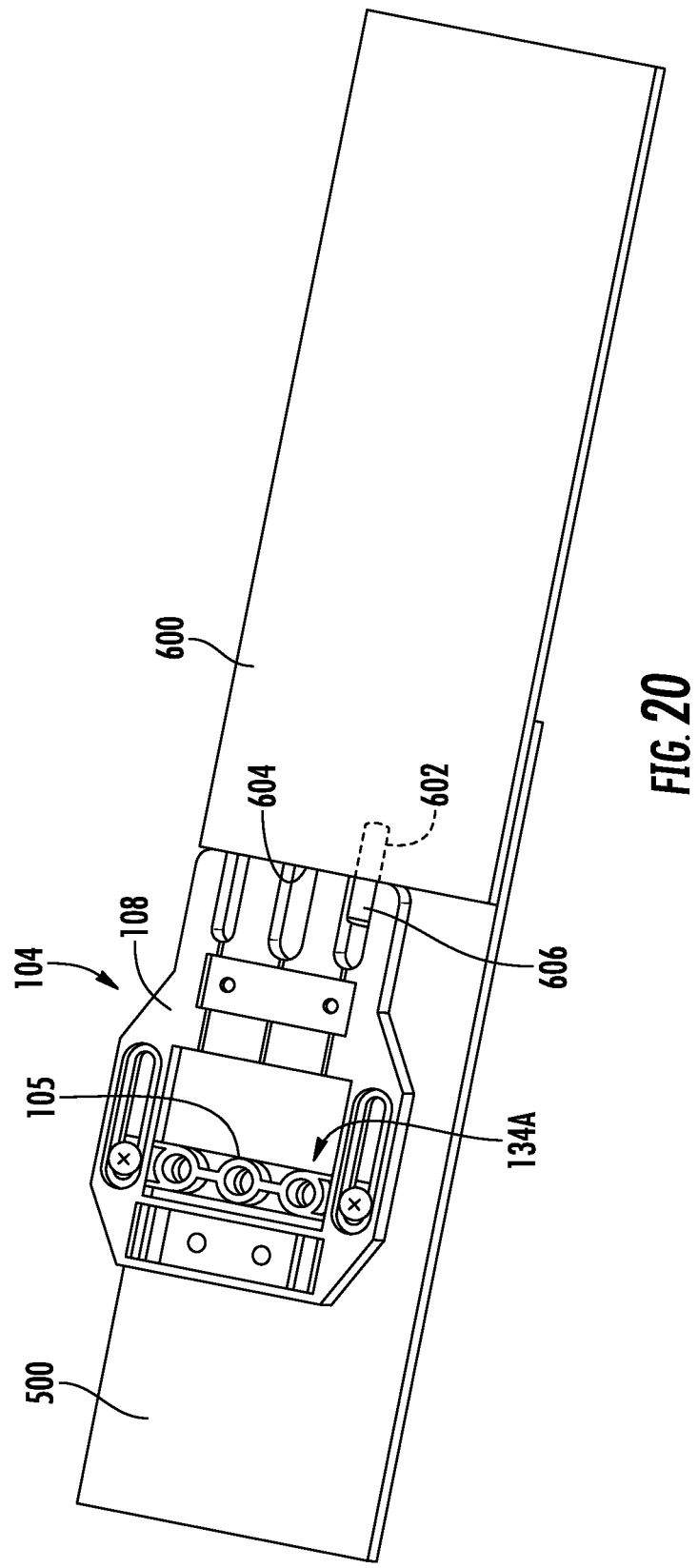

DOWEL JIG

FIELD OF THE INVENTION

This invention generally relates to jigs for drilling work pieces and particularly a dowel jig.

BACKGROUND OF THE INVENTION

Workpieces are often connected using dowel pins inserted into aligned holes formed into each of the workpieces. This type of connection allows for hiding the fastener for a high end appearance.

To provide the high-end appearance, it is important that the holes in one workpiece properly align with the holes in the second workpiece. It is also important to properly locate the holes relative to the sides of the workpiece. This is particularly important when it is desired to have the sides of one workpiece align with the sides of another workpiece once joined.

Jigs are often used to assist in forming the holes in the workpieces in the appropriate positions.

While prior jigs work, there is always the need for more accurate, faster, and easier to use jigs to reduce production time and to improve results. Examples of the present invention provide improvements over the current state of the art as it relates to dowel jigs.

BRIEF SUMMARY OF THE INVENTION

In an example, a dowel jig having a main body, a first side stop, a clamp assembly and a drill guide is provided. The main body has a first leg and a second leg. The first leg provides a first workpiece abutment face. The first leg has a drill guide cavity proximate the first workpiece abutment face. The second leg provides a second workpiece abutment face. The first workpiece abutment face being perpendicular to the second workpiece abutment face. The first side stop is adjustably mounted to the second leg. The first side stop is adjustable between a retracted position where the first side stop is positioned rearward of or aligned with a second abutment plane provided by the second abutment face and an extended position where the first side stop is positioned forward of the second abutment plane. The clamp assembly is selectively mountable to the first leg and selectively mountable to the second leg. The clamp assembly has a clamping head that is movable towards and away from the second leg when the clamp assembly is mounted to the first leg. The clamping head is movable towards and away from the first leg when the clamp assembly is mounted to the second leg. The clamp assembly is positioned forward of the second abutment plane when the clamp is mounted to the first leg. The drill guide is mountable to the first leg within the drill guide cavity. The drill guide defines at least one through bore having a central axis that is orthogonal to the first workpiece abutment face and parallel to the second workpiece abutment face.

In an example, the first side stop is pivotally mounted to a first side of the second leg for pivoting about a rotational axis that is parallel to the second abutment plane between the retracted and extended positions.

In an example, a second side stop is adjustably mounted to the second leg. The second side stop is adjustable between a retracted position where the second side stop is positioned rearward of or aligned with the second abutment plane provided by the second abutment face and an extended position where the second side stop is positioned forward of the second abutment plane.

In an example, the first and second side stops are mounted on opposed sides of the second leg. The second leg is positioned between the first and second side stops.

In an example, the first side stop defines a third abutment face. A workpiece is able to abut the third abutment face when the first side stop is in the extended state and the workpiece is abutted against the first and second abutment faces.

In an example, when mounted to the first leg within the drill guide cavity, the drill guide is recessed into the first leg beyond the first abutment face or flush with the first abutment face and does not project outward beyond the first abutment face.

In another embodiment, a dowel jig including a main body, a drill guide, and a spacer is provided. The main body has a first leg and a second leg. The first leg provides a first workpiece abutment face. The first leg has a drill guide cavity proximate the first workpiece abutment face. The second leg provides a second workpiece abutment face. The first workpiece abutment face is perpendicular to the second workpiece abutment face. The drill guide is adjustably mountable to the first leg within the drill guide cavity. The drill guide defines at least one through bore having a central axis that is orthogonal to the first workpiece abutment face and parallel to the second workpiece abutment face. The adjustable mounting of the drill guide permits the through bore to be mounted at different distances spaced away from the second workpiece piece abutment face (e.g. forward of). The drill guide spacer has a spacer body and a spacer locating pin. The spacer body has a first spacer abutment and a second spacer abutment. The spacer locating pin extends from the spacer body defining a pin axis. The spacer locating pin is sized to be received in the at least one through bore of the drill guide. The first spacer abutment is spaced a first distance from the pin axis such that engagement of the first spacer abutment with the second abutment face spaces the through bore of the drill guide a first distance from the second abutment face when the spacer locating pin is within the at least one through bore. The second spacer abutment is spaced a second distance from the pin axis such that engagement of the second spacer abutment with the second abutment face spaces the through bore of the drill guide a second distance from the second abutment face when the spacer locating pin is within the at least one through bore. The second distance is different than the first distance.

In an example, the first spacer abutment is a first planar side of the spacer body and the second spacer abutment is a second planar side of the spacer body. The first and second planar sides are parallel to one another and face away from one another with the spacer locating pin positioned therebetween.

In an example, the drill guide includes at least two through bores including a first through bore and a second through bore. Each through bore of the at least two through bores defines a central axis. The central axes of the at least two through bores being aligned along an alignment axis. The alignment axis is parallel to the second abutment face. The drill guide spacer has first and second spacer locating pins. The first pin is received in the first through bore and the second pin is received in the second through bore when the first spacer abutment engages the second abutment face to offset the first and second through bores of the drill guide insert a first distance from the second abutment face. The first pin is received in the second through bore and the second pin is received in the first through bore when the second spacer abutment engages the second abutment face to offset the first and second through bores of the drill guide insert a second distance from the second abutment face. The second distance is different than the first distance. Typically, in this embodiment, the spacer is rotated 180 degrees between the two different orientations.

In an example, a second drill guide is adjustably mountable to the first leg within the drill guide cavity. The second drill guide defines at least one through bore having a diameter that is greater than a diameter of the first drill guide. The at least one through bore has a central axis that is orthogonal to the first workpiece abutment face and parallel to the second workpiece abutment face. The adjustable mounting of the drill guide permits the through bore to be mounted at different distances spaced away from the second workpiece piece abutment face. A second drill guide spacer is provided. The second drill guide spacer includes a second spacer body having a third spacer abutment and a fourth spacer abutment. The second drill guide spacer includes a third spacer locating pin extending from the second spacer body that defines a second pin axis. The spacer locating pin has a diameter sized to be received in the at least one through bore of the second drill guide but that is larger than the diameter of the through bore of the first drill guide. The third spacer abutment is spaced a third distance from the second pin axis such that engagement of the third spacer abutment with the second abutment face spaces the through bore of the second drill guide a third distance from the second abutment face when the third spacer locating pin is within the at least one through bore of the second drill guide. The fourth spacer abutment is spaced a fourth distance from the second pin axis such that engagement of the fourth spacer abutment with the second abutment face spaces the through bore of the second drill guide a fourth distance from the second abutment face when the third spacer locating pin is within the at least one through bore of the second drill guide. The fourth distance is different than the third distance. In some embodiments, the first and third distances are the same and the second and fourth distances are the same. In other embodiments, the all of the first—fourth distances are different.

In an example, the drill guide spacer has two spaced apart locating pins extending from the spacer body defining an offset axis therebetween. The spacer body further including a marking bore positioned between the two spaced apart locating pins, the marking bore defining a marking bore central axis that is located on the offset axis and that is positioned at a midpoint between the two spaced apart locating pins.

In another example, a dowel jig is provided. The dowel jig includes a main body, a clamp assembly, and a drill guide. The main body has a first leg providing a first workpiece abutment face. The first leg has a drill guide cavity proximate (e.g. within) the first workpiece abutment face. The first leg has a first clamp mounting recess. The main body has a second leg providing a second workpiece abutment face. The first workpiece abutment face is perpendicular to the second workpiece abutment face. The second leg has a second clamp mounting recess. The first and second clamp mounting recesses have a same cross-sectional shape and size. The clamp assembly has a clamping head mounted to a mounting block. The clamping head is movable relative to the mounting block. The mounting block has a base region having a same cross-sectional shape as the first and second clamp mounting recesses. The mounting block is sized to fit within the first and second clamp mounting recesses. The clamp assembly is selectively mountable to the first leg with the base region received in the first clamp mounting recess. The clamp assembly is selectively mountable to the second leg with the base region received in the second clamp mounting recess. The clamping head is movable towards and away from the second leg when the clamp assembly is mounted to the first leg. The clamping head is movable towards and away from the first leg when the clamp assembly is mounted to the second leg. The drill guide is mountable to the first leg within the drill guide cavity. The drill guide defines at least one through bore having a central axis that is orthogonal to the first workpiece abutment face and parallel to the second workpiece abutment face.

In an example, the size of the base region mates with the first and second clamp mounting recesses.

In an example, at least one fastener releasably secures the mounting block within the first clamp mounting recess when mounted to the first leg and releasably secures the mounting block within the second clamp mounting recess when mounted to the second leg.

In an example, the first workpiece abutment face defines a first workpiece abutment plane against which a workpiece abuts. The first clamp mounting recess extends into the first leg beyond the first workpiece abutment plane. The second workpiece abutment face defines a second workpiece abutment plane against which the workpiece abuts. The second clamp mounting recess extends into the second leg beyond the first workpiece abutment plane.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 20 is a perspective illustration of the dowel jig in the third configuration being used to form a dowel hole in a face of a workpiece.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
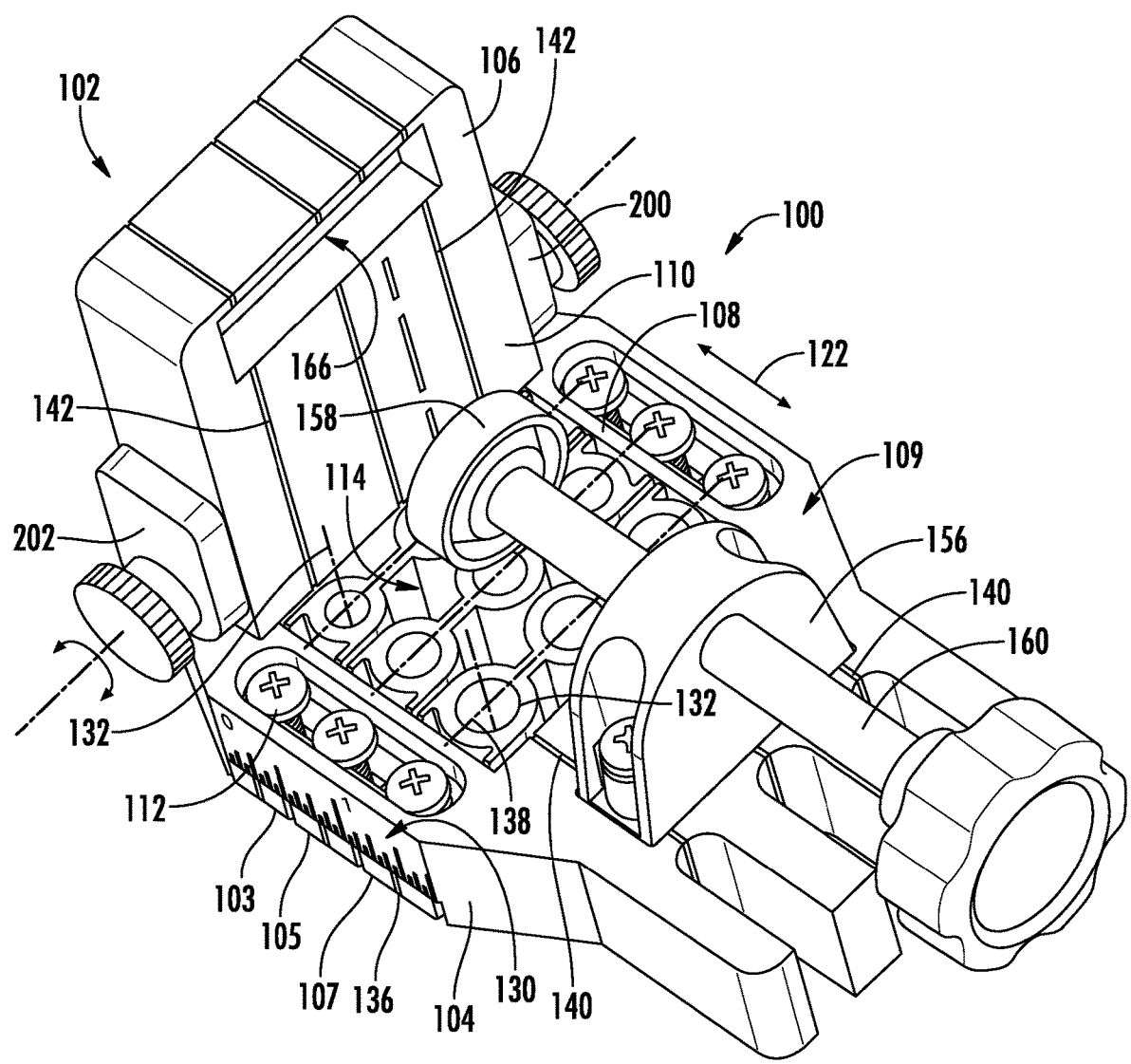
FIG. 1 is a perspective illustration of a dowel jig in a first configuration.

FIG. 1 illustrates a dowel jig 100 for forming holes in workpieces (e.g. pieces of wood) for connecting two workpieces together using a dowel pin as is well known in the art. The dowel jig 100 allows for accurate location of the dowel holes in the individual workpieces. This allows for proper alignment of the two connected workpieces, e.g. such that sides of the workpieces align to make smooth clean joints between the two workpieces. The dowel jig 100 is reconfigurable between multiple different configurations for forming dowel holes in different portions of a workpiece.

Figure 2:
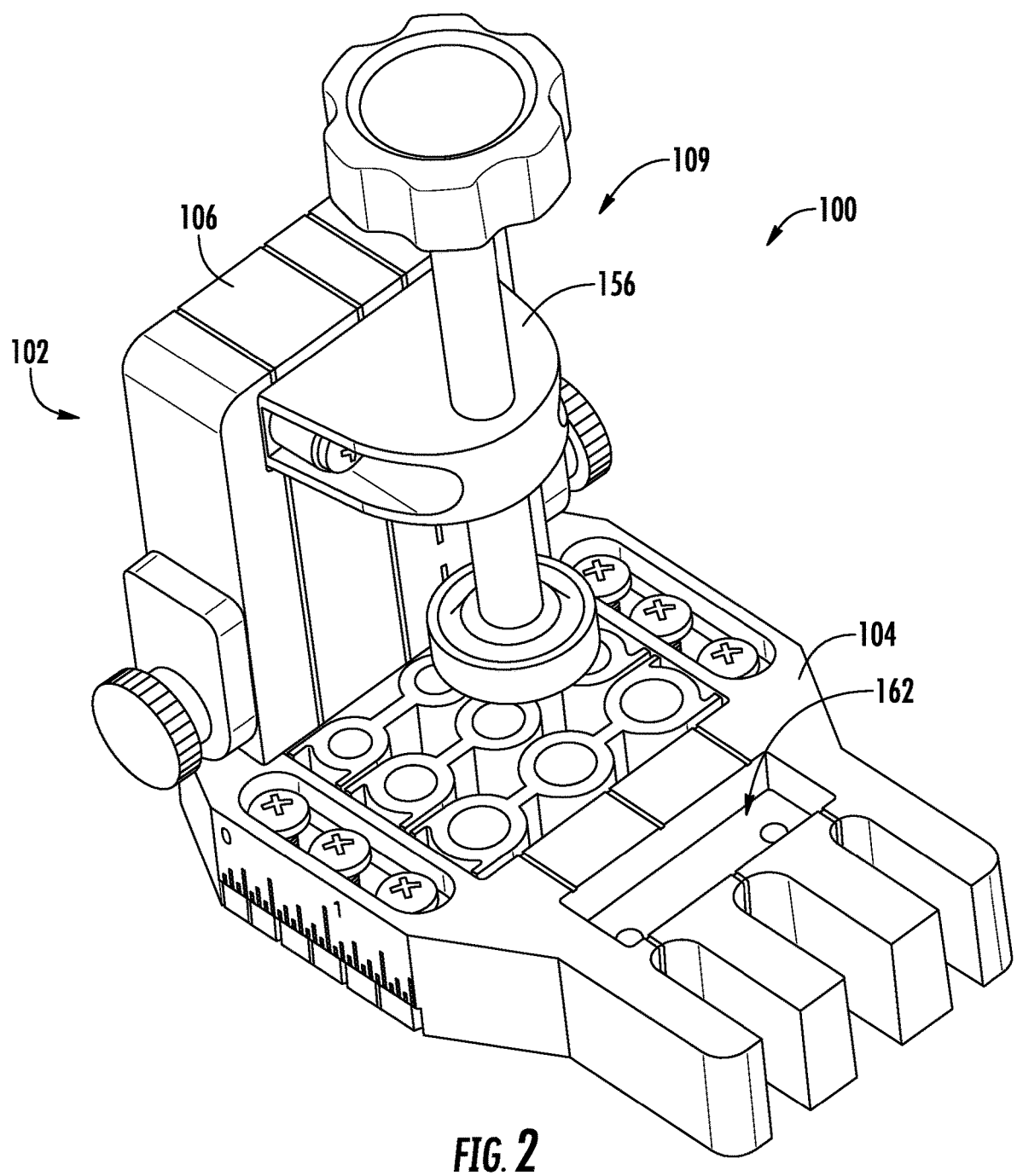
FIG. 2 is a perspective illustration of the dowel jig in a second configuration.
Figure 3:
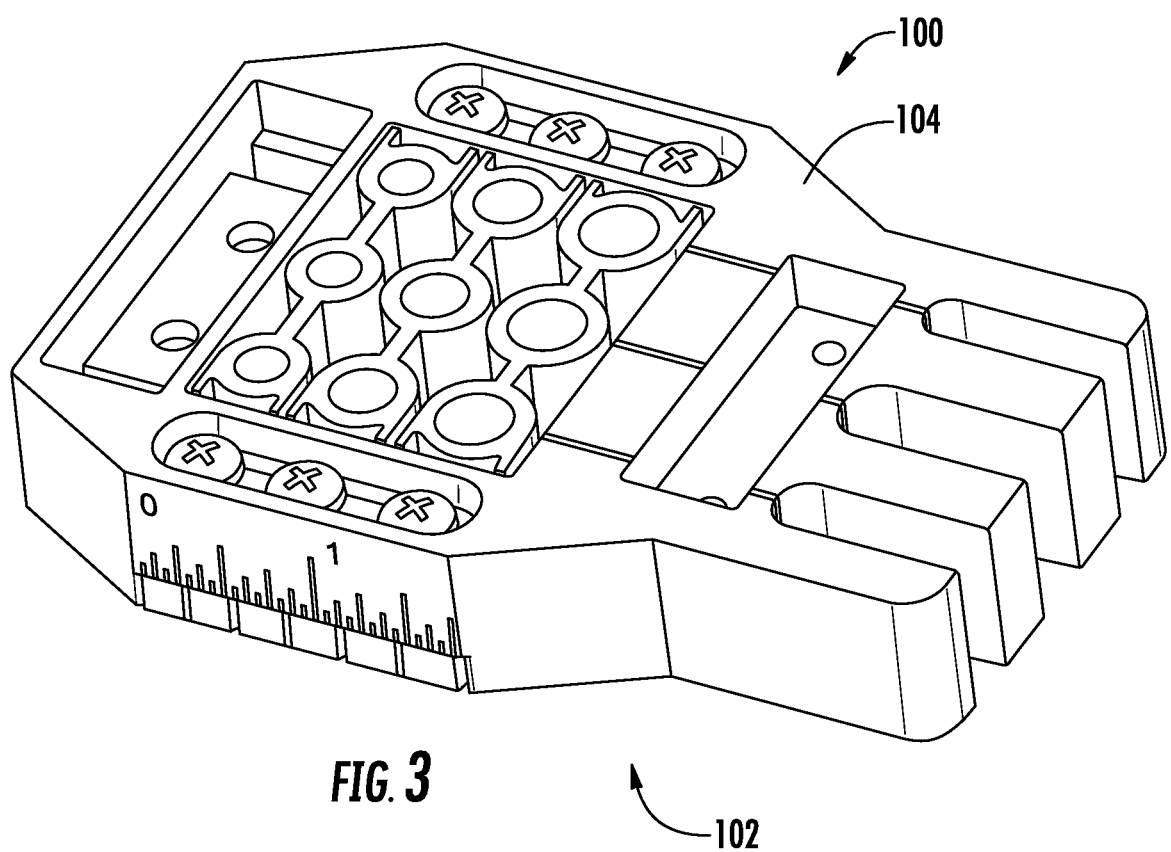
FIG. 3 is a perspective illustration of the dowel jig in a third configuration.

The configuration illustrated in FIG. 1 can be used for forming dowel holes in an end or side of a workpiece. The configuration illustrated in FIG. 2 can be used for forming dowel holes in a face of a workpiece proximate a side or end. The configuration illustrated in FIG. 3 can be used for forming dowel holes in a face of a workpiece that is spaced far away from the side or ends of the workpiece.

Figure 4:
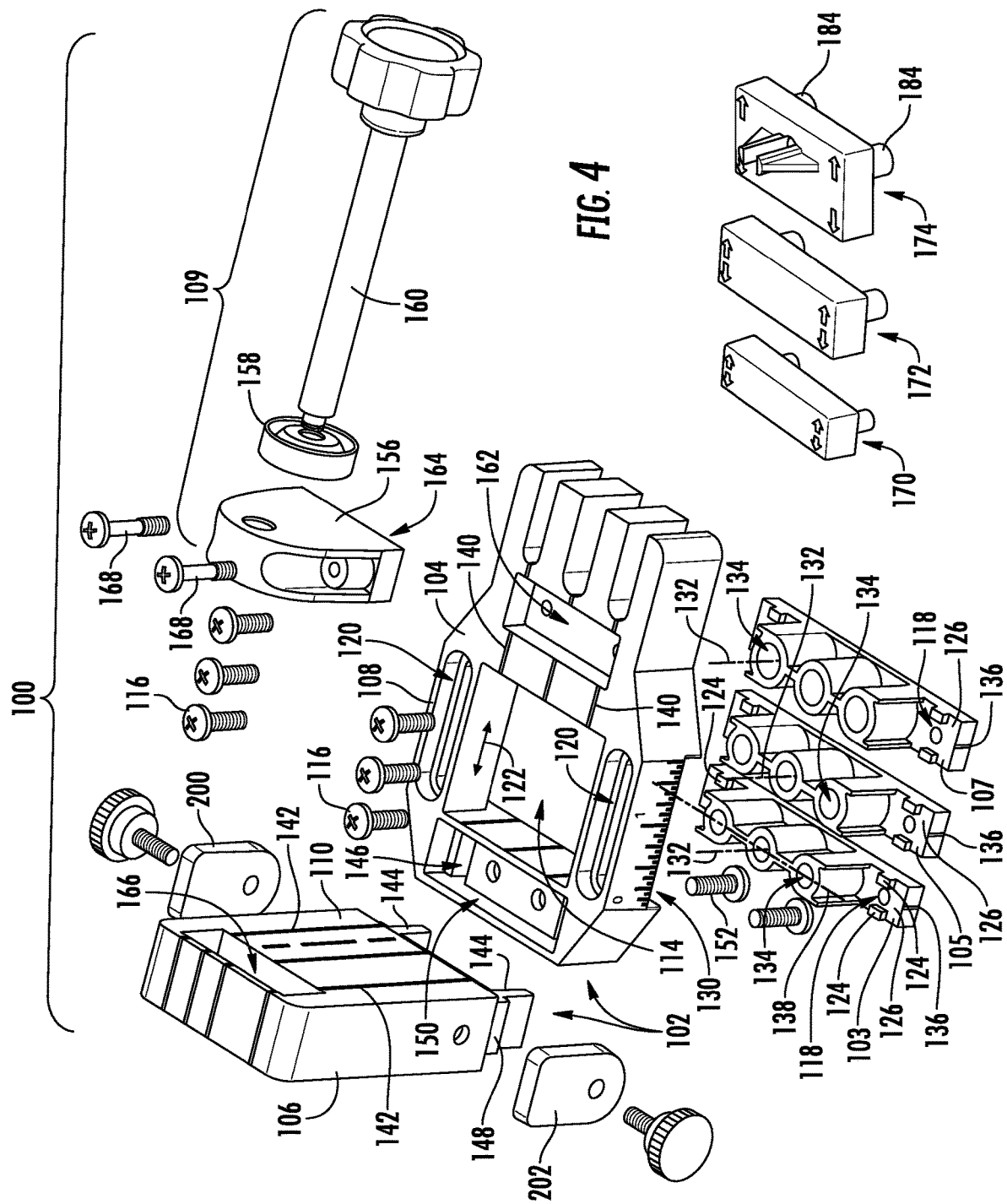
FIG. 4 is an exploded perspective illustration of the dowel jig.

With principle reference to FIGS. 1 and 4, the dowel jig 100 generally includes a main body 102 that supports and locates one or more drill guides 103, 105, 107. Additionally, the drill dowel jig 100 includes a clamp assembly 109 for fixing the position of a workpiece relative to the main body 102 and drill guides 103, 105, 107 when the dowel holes are drilled into the workpiece.

The main body 102 includes a first leg 104 and a second leg 106 operably connected to one another. The first leg 104 provides a first workpiece abutment face 108 that defines a first workpiece abutment plane and the second leg 106 provides a second workpiece abutment face 110 that defines a second workpiece abutment plane. The first and second workpiece abutment faces 108, 110 (and corresponding workpiece abutment planes) are generally perpendicular to one another. A workpiece can be aligned relative to the dowel jig 100 by abutting the workpiece against the first and second workpiece abutment faces 108, 110.

Once properly positioned, the clamp assembly 109 can be used to apply pressure to the workpiece to secure the workpiece to the main body 102.

The first leg 104 includes a drill guide cavity 114 formed in the first abutment face 108. The drill guides 103, 105, 107 are mountable to the first leg 104 within the drill guide cavity 114 (see FIG. 1). The drill guides 103, 105, 107 are adjustably mountable to the first leg 104 such that the position of the drill guides 103, 105, 107 relative to the second abutment face 110 can be changed so as to properly locate the drill guide 10, 105, 107 relative to a workpiece, such as when working with workpieces of different thicknesses.

In this embodiment, the drill guides 103, 105, 107 are mountable to the first leg 104 by fasteners 116 illustrated in the form of screws. The drill guides 103, 105, 107 have threaded apertures 118 that receive the screws 116. The first leg 104 includes mounting slots 120 that receive the screws 116. The slots 120 allow the drill guides 103, 105, 107 to be adjusted toward or away from the second leg 106 and particularly the second abutment face 110 as represented by arrow 122.

The slots 120 have an enlarged portion which receives the heads of the screws 116 and a narrow portion through which the shaft of the screws 116 extend. Preferably the enlarged portion is deep enough to completely recess the screws 116 below the first abutment face 108.

The drill guides 103, 105, 107 include alignment features 124 that are axially received within the slots 120 to keep the drill guides 103, 105, 107 at a proper, e.g. parallel, orientation relative to the second abutment face 110. However, the alignment features 124 allow for sliding motion of the drill guides 103, 105, 107 relative to the first leg 104 for proper spacing. In this embodiment, the alignment features 124 are a pair of projections proximate opposed ends of the drill guides 103, 105, 107. The projections 124 extend from a flange portion 126 that is axially pressed against a back side of the first leg 104 when in a mounted fixed orientation. The threaded apertures 118 are located between the projections 124 and are formed in the flange portion 126. While two projections 124 are illustrated, in other embodiments a single projection 124 could be used. Such a single projection should be long enough in a direction parallel to the longitudinal axis of the slots 120 to prevent or substantially limit any twisting within the slots 120 to prevent improper alignment of the drill guides 103, 105, 107 relative to the second leg 106.

The outer sides of the first leg 104 includes an alignment scale 130 that identifies the spacing of the drill guides 103, 105, 107 relative to the second leg 106. In particular, the scale 130 identifies the distance a central axis 132 of the through bores 134 of the drill guides 103, 105, 107 from the second abutment surface 110.

The drill guides 103, 105, 107 include an alignment marker 136 (preferably at both ends) that aligns with the marks of the alignment scale 130 to properly align the drill guides 103, 105, 107.

The through bores 134 are aligned on an alignment axis 138 along which the central axis 132 of the through bores 134 of a same drill guide are laterally offset. The alignment projections 124 maintain the alignment axis 138 parallel to the second abutment face 110 such that all of the through bores 134 of the individual drill guide 103, 105, 107 are equally spaced from the second abutment face 110. The alignment axis 138 preferably aligns with the alignment marker 136.

The central axis 132 of the through bores 134 is parallel to the second abutment face 110 and orthogonal to the first abutment face 108.

In the illustrate example, the dowel jig 100 is provided with three drill guides 103, 105, 107. In other examples, more or fewer drill guides can be provided. The drill guides 103, 105, 107 in this example are identical except that the diameter of the through bores 134 differ. In one example, the diameter of the through bores 134 of the drill guide 103 is sized for a ¼ inch drill bit; the diameter of the through bores 134 of the drill guide 105 are sized for a 5/16 inch drill bit; and the diameter of the through bores 134 of the drill guide 107 are sized for a ⅜ inch drill bit. The different diameters are used to form different diameter holes for use with different diameter dowel pins.

In one example, the through bore 134 of a given drill guide 103, 105, 107 are evenly spaced apart along the alignment axis 138. In one example, the central axes 132 of adjacent through bores 134 are spaced 1 inch from one another.

The first and second abutment faces 108, 110, in one example, include optional alignment grooves 140, 142. These alignment grooves 140, 142 align with the central axes 132 of the through bores 134 to all for one option for properly aligning a workpiece relative to the through bores 134.

The second leg 106 includes a plurality of mounting projections 144 that are received in corresponding recesses 146 in the first leg 104. The projections 144 extend from an alignment block 148. The alignment block 148 extends into a rectangular recess 150 in the first leg. The cooperation between projections 144 and recesses 146 as well as alignment block and recess 150 provide a strong and accurate connection between the first and second legs 104, 106. Fasteners in the form of screws 152 can fix the second leg 106 to the first leg 104.

The clamp assembly 109 can be repositioned from being mounted to the first leg 104 (see FIG. 1) to being mounted to the second leg 106 (see FIG. 2) depending on the configuration of the dowel jig 100. The first orientation allows for the clamp 109 assembly to apply a clamping force perpendicular to the second abutment face 110 while the second orientation allows for the clamp assembly 109 to apply a clamping force that is perpendicular to the first abutment face 108.

The clamp assembly 109 generally includes a clamp mounting block 156 and a clamping head 158. The clamping head 158 is movable relative to the mounting block 156 to adjust for different sized workpieces and to adjust clamping forces. In this embodiment, the clamping head 158 is carried by a threaded shaft 160 that is threaded through the mounting block 156.

The first leg 104 includes a first clamp mounting recess 162 that is sized and configured to mate with a base region 164 of the mounting block 156. The second leg 106 includes a second clamp mounting recess 166 that is sized and configured to mate with the base region 164. Typically, these recesses 162, 166 will be identical. In this embodiment, the recesses have a generally rectangular cross-section that is substantially identical to the rectangular cross-section of the base region 164. This allows for quick and proper alignment of the clamp assembly 109 when switching between different configurations.

Fasteners in the form of screws 168 are used to secure the mounting block 156 to the first and second legs 104, 106.

The first clamp mounting recess 162 is recessed into the first leg 104 beyond the first workpiece abutment face 108 and the second clamp mounting recess 166 is recessed into the second leg 106 beyond the second workpiece abutment face 110.

To facilitate highly accurate spacing of the drill guides 103, 105, 107, the dowel jig 100 may be provided with drill guide spacers 170, 172, 174. This dowel jig 100 may be considered a kit. The drill guide spacers 170, 172, 174 are configured to be inserted into the through bores 134 of the corresponding drill guides 103, 105, 107, respectively. Thereafter, the drill guides 103, 105, 107 can be moved relative to the first and second legs 104, 106 until the corresponding drill guide spacer 170, 172, 174 abuts the second abutment face 110. Then, the user may tighten the fasteners 116 to secure the drill guide 103, 105, 107 relative to the first leg 104.

The drill guide spacers 170, 172, 174 are substantially similar except they are configured to cooperate with the different diameter through bores 134 of the different drill guides 103, 105, 107. Further, drill guide spacer 174 has some additional features. Typically, the larger diameter drill guides will be used for workpieces that have bigger thicknesses.

As such, the drill guide spacers 170, 172, 174 will generally be described with reference to drill guide spacer 174.

FIGS. 5-11 illustrate the drill guide spacer 174 and the operation thereof.

Figure 5:
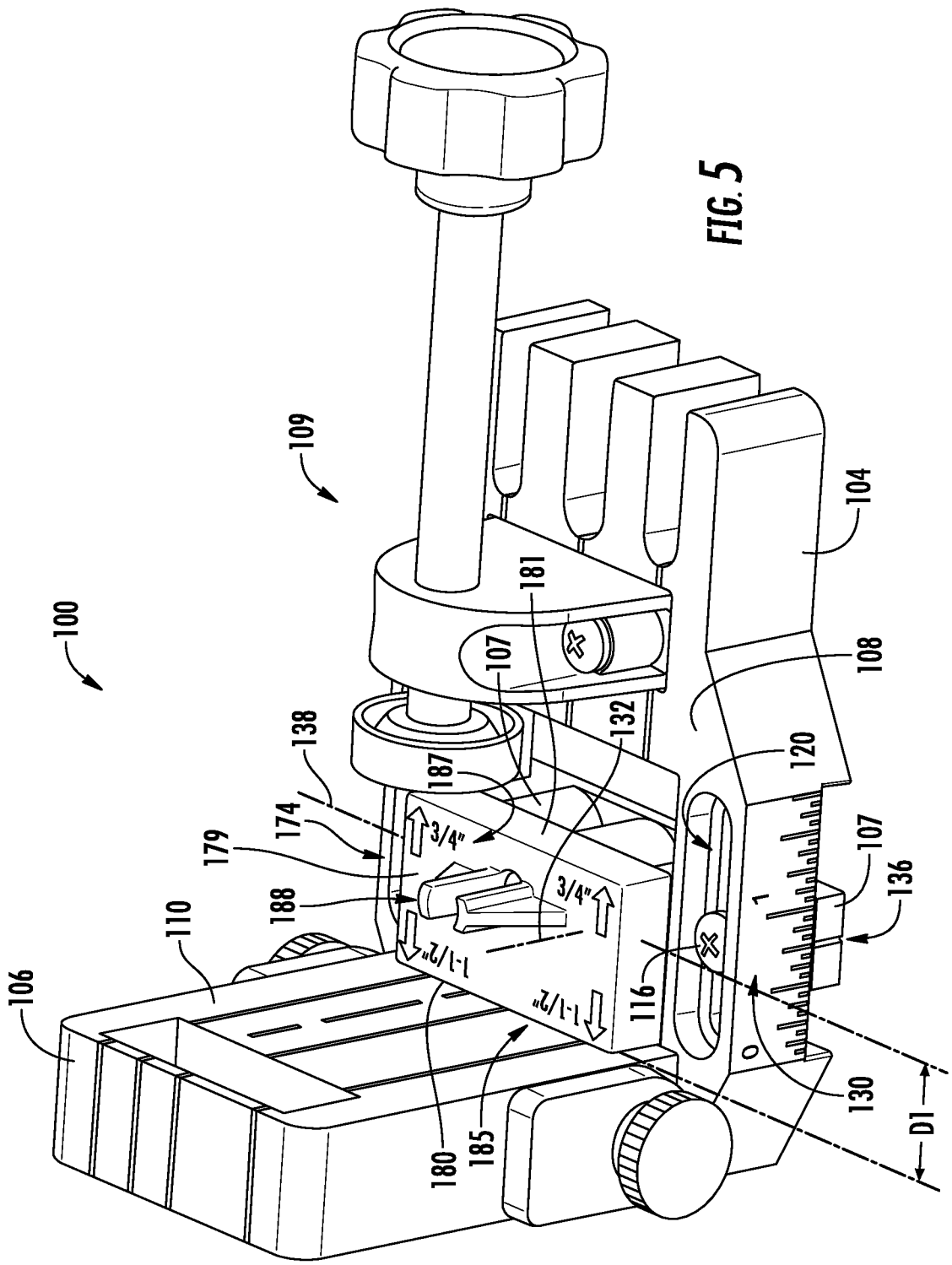
FIG. 5 is a perspective illustration of the dowel jig using a drill guide spacer to space a drill guide to a first position.

In FIG. 5, the drill guide spacer 174 is mounted to drill guide 107. The drill guide 107 has been positioned such that a spacer body 179 and particularly a first spacer abutment 180 of the spacer body 179 is abutted against the second abutment face 110 of the second leg 106. In addition to the first spacer abutment 180, the spacer body 179 provides a second spacer abutment 181. In this example, the first and second spacer abutments 180, 181 are opposed sidewalls of the spacer body 179 that are parallel to one another and that face away from one another. In an example, these sidewalls are planar. However, in other embodiments, different spacer abutments could be used such that they properly engage the second abutment face 110 to properly space the drill guide 107 from the second abutment face.

In the position illustrated in FIG. 5, the alignment axis 138 of the drill guide 107 and the central axes 132 of the through bores 134 are spaced a first distance D1 from the abutment plane defined by the second abutment face 110.

Figure 6:
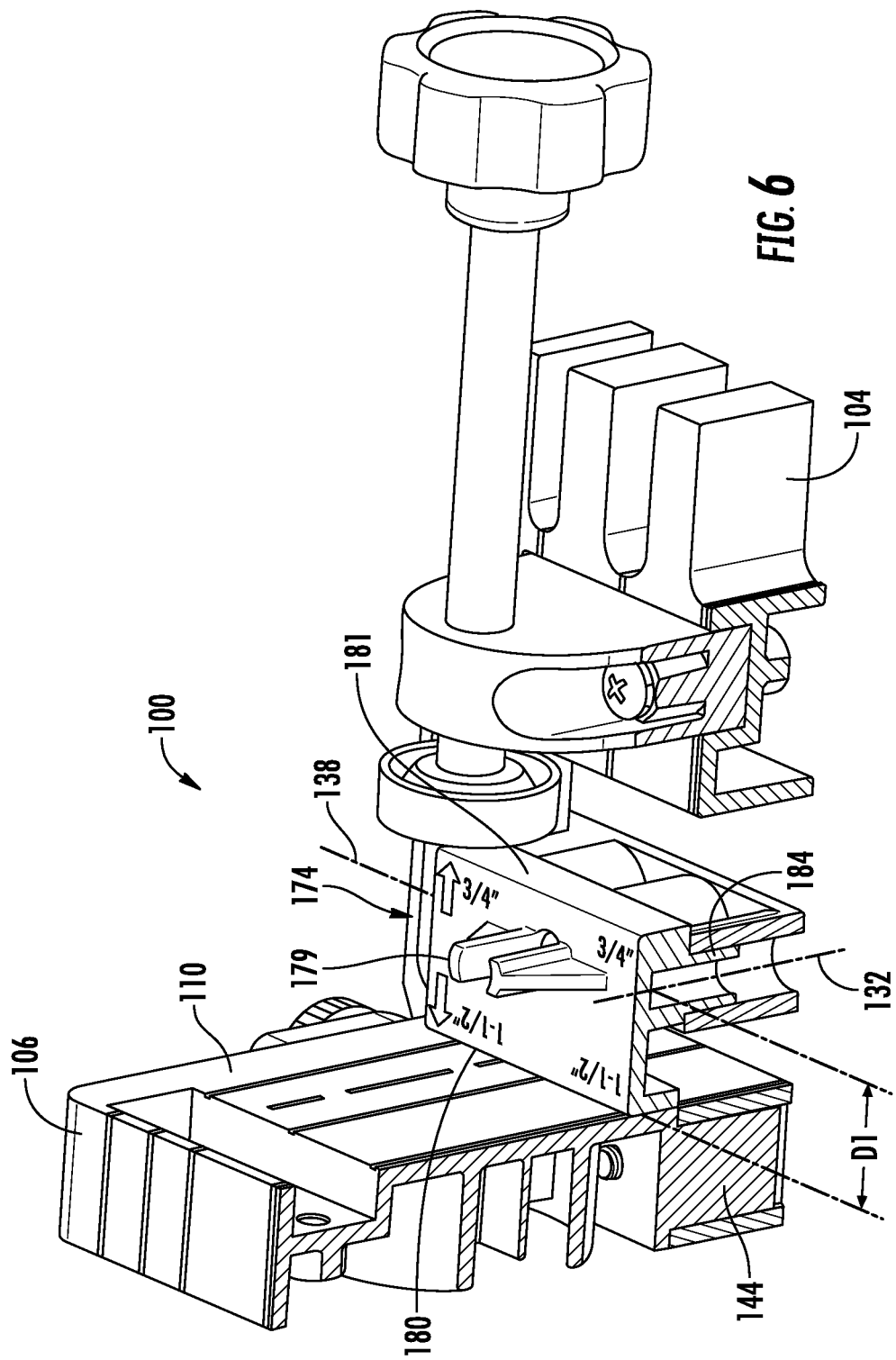
FIG. 6 is a perspective cross-sectional illustration of FIG. 5.
Figure 7:
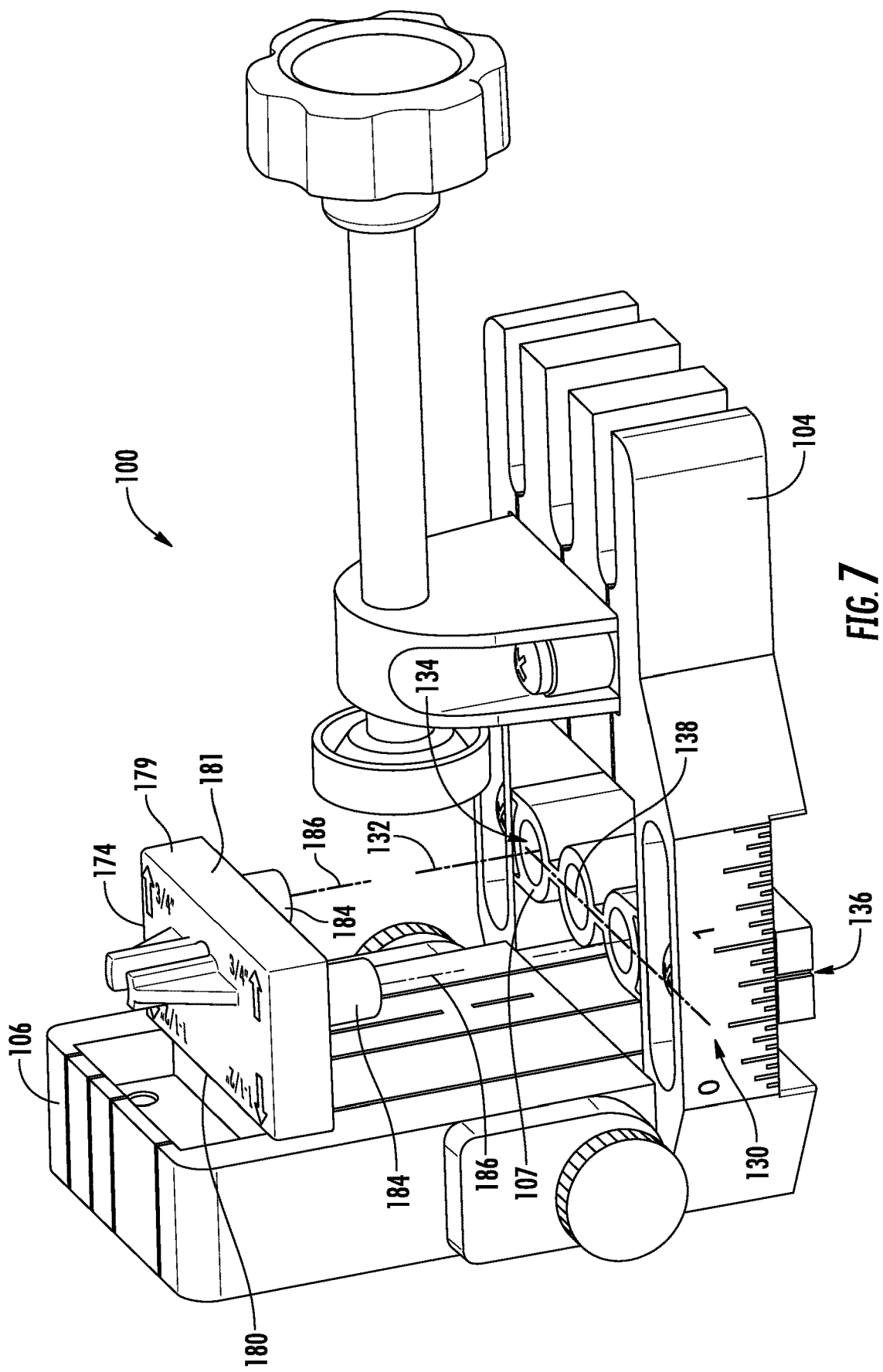
FIG. 7 has the drill guide spacer exploded from the drill guide.
Figure 8:
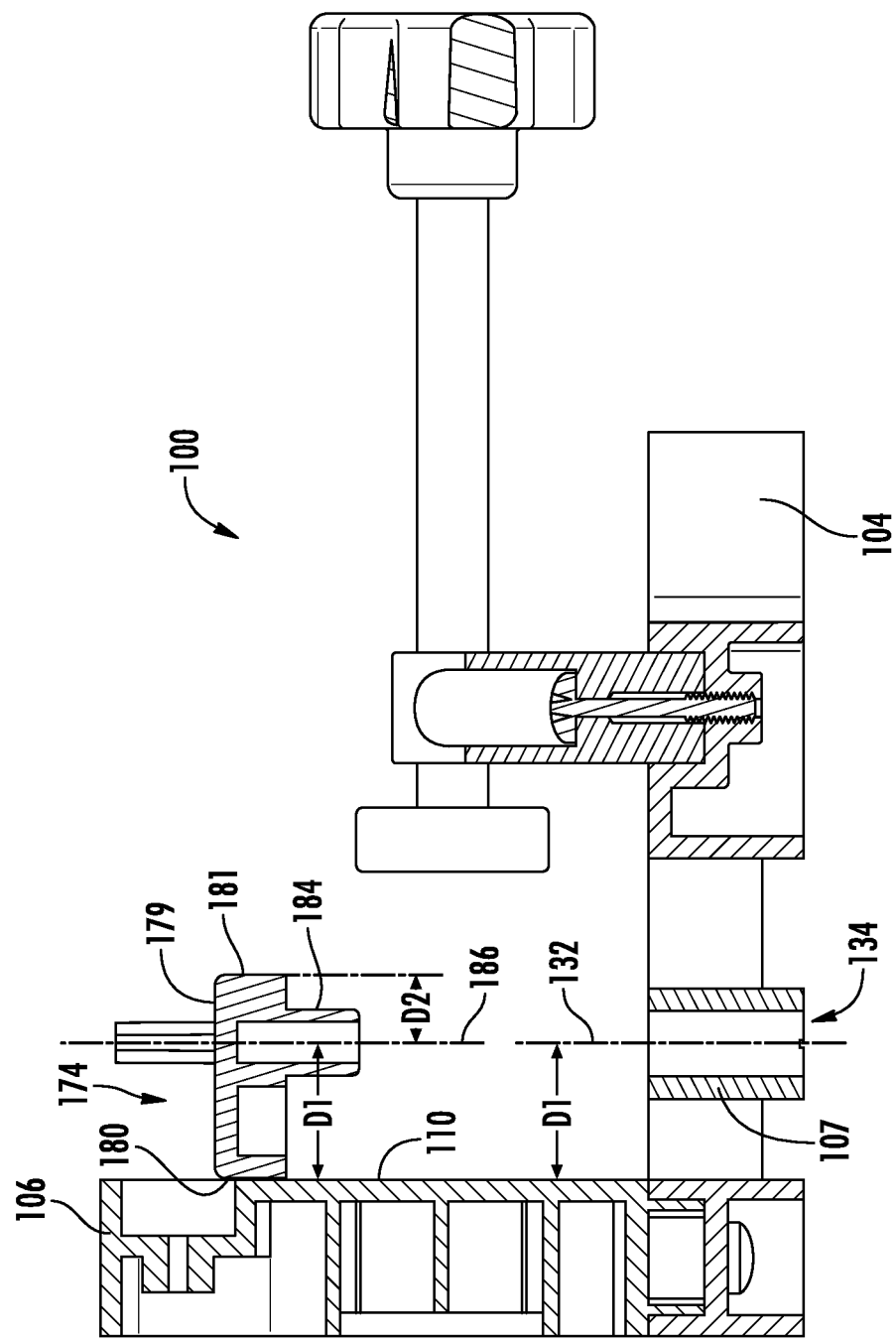
FIG. 8 is a cross-sectional illustration of FIG. 7.

This spacing D1 is further illustrated in FIGS. 6 and 8.

The drill guide spacer 174 includes a pair of spacer locating pins 184 that extend from the spacer body 179. The spacer locating pins 184 are axially received in the through bore 134 of the drill guide 107 and particularly two outer most through bores 134, in this example. Each spacer locating pins 184 defines a pin axis 186 that is coaxial with the central axis 132 of the corresponding through bore 134 when the drill guide spacer 174 is mounted to the drill guide 107.

The pin axis 186 is spaced the first distance D1 from the first spacer abutment 180. However, the pin axis 186 is spaced a second distance D2 from the second spacer abutment 181. The second distance D2 is different than the first distance D1. A such, depending on which one of the first and second spacer abutments 180, 181 is abutted with second abutment face 110, the spacing of the central axes 132 of through bores 134 is varied.

With reference to FIG. 5, with the first spacer abutment 180 abutted against the second abutment face 110 of the second leg 106, the alignment marker 136 of the drill guide 107 aligns with the tick mark of scale 130 that represents ¾ inch. This indicates that the central axes 132 of the through bores 134 as well as the pin axes 186 are spaced ¾ inch from the second abutment face 110. Thus, this would typically be used with a workpiece having a thickness of 1.5 inch such that the through bores 134 are centered on the thickness of the workpiece. Notably, indicia 185 is provided on the spacer body 179 that indicates that first spacer abutment 180 would typically be used with a workpiece having a thickness of 1.5 inch.

Figure 9:
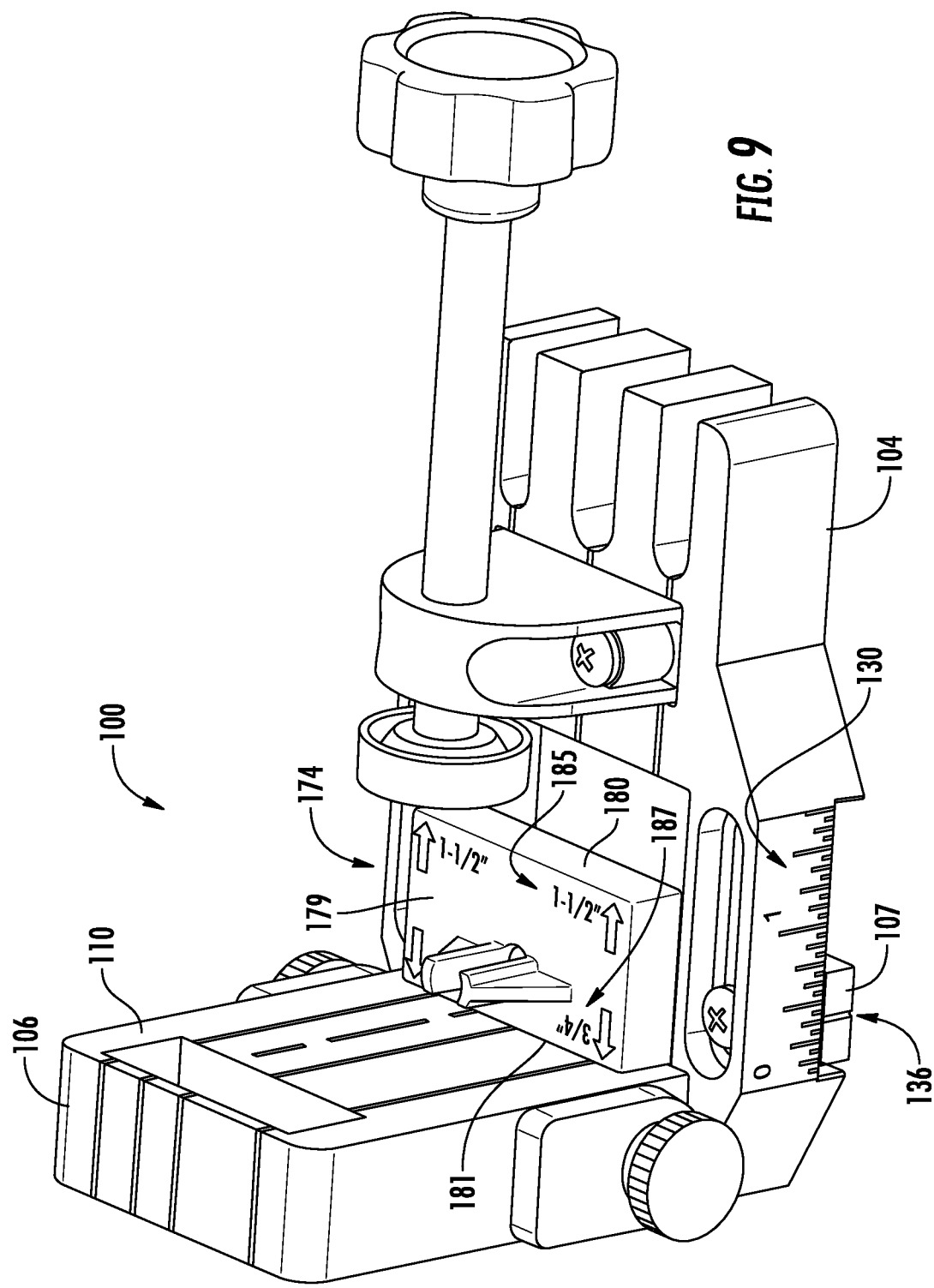
FIG. 9 is a perspective illustration of the dowel jig using the drill guide spacer to space a drill guide to a second position.
Figure 10:
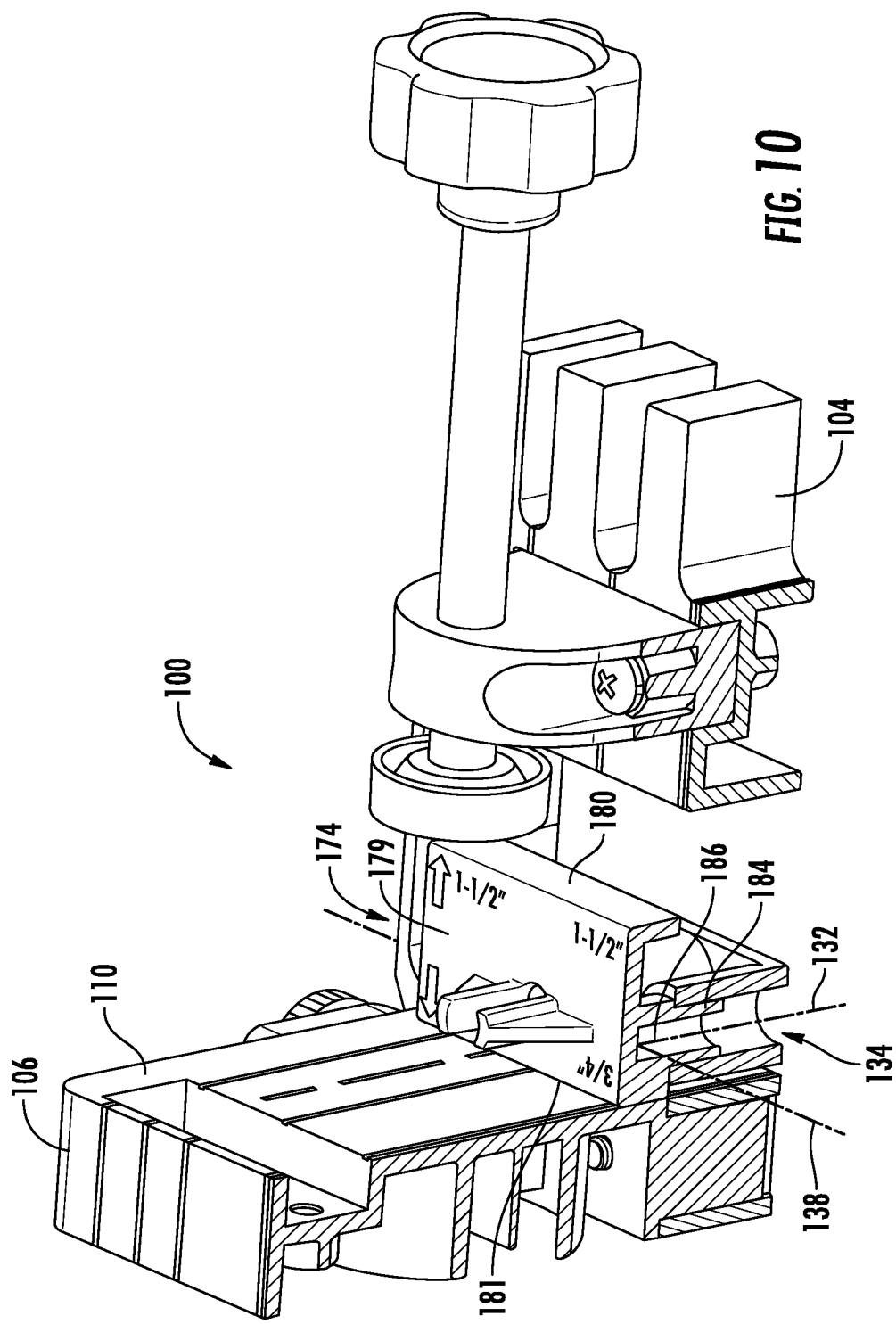
FIG. 10 is a perspective cross-sectional illustration of FIG. 9.
Figure 11:
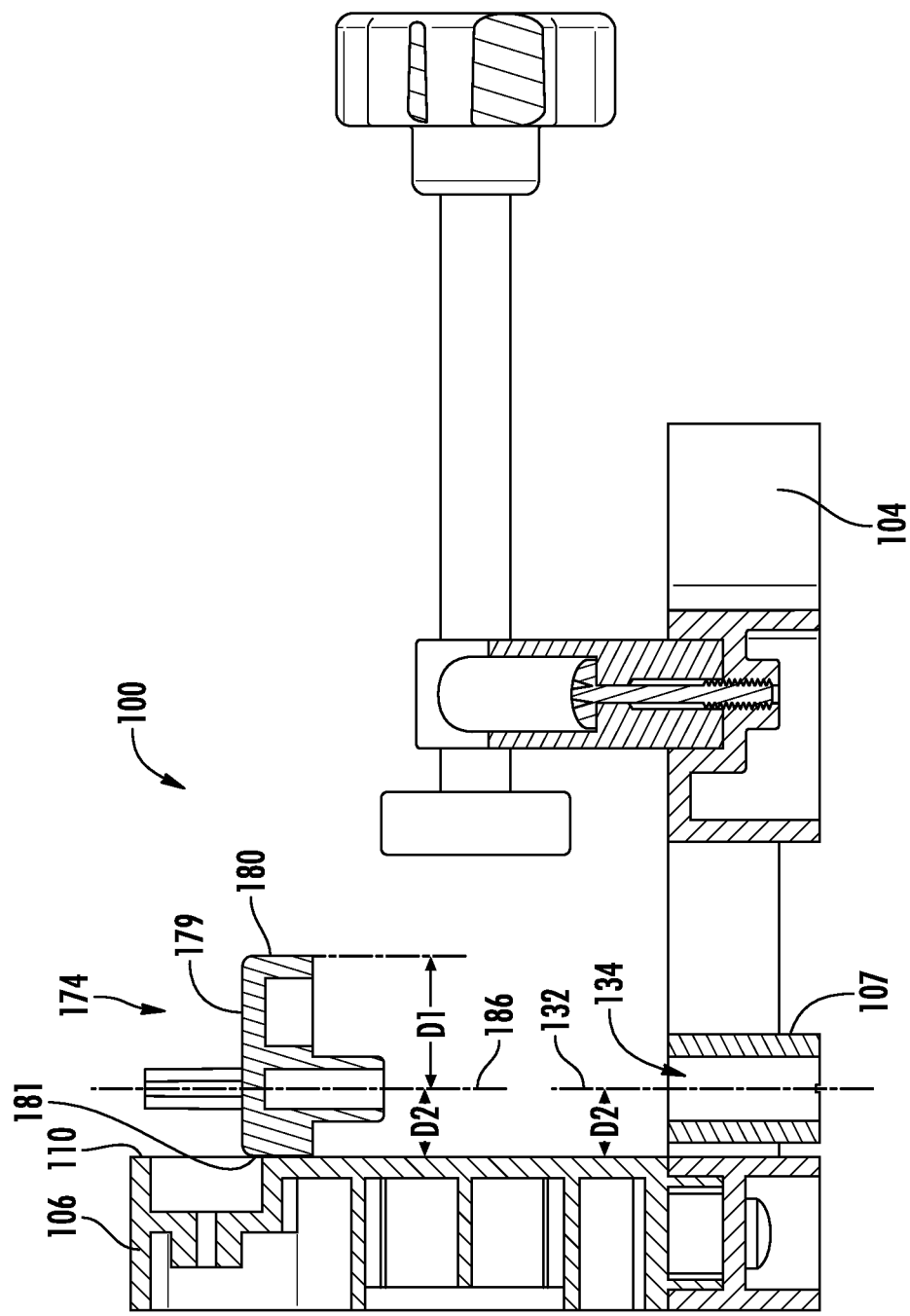
FIG. 11 has the drill guide spacer exploded from the drill guide and is a cross-sectional illustration.

In FIG. 9, the second spacer abutment 181 is abutted against the second abutment face 110. The alignment marker 136 is now aligned with the tick mark of scale 130 that represents ⅜ inch. This indicates that the central axes 132 of the through bores 134 as well as pin axes 186 are spaced ⅜ from the second abutment face 110. Thus, this would typically be used with a workpiece having a thickness of ¾ inch such that the through bores 134 are centered on the thickness of the workpiece. Again, indicia 187 is provided on the spacer body 179 that indicates that second spacer abutment 181 would be used with a workpiece having a thickness of ¾ inch.

Thus, engagement of the first spacer abutment 180 with the second abutment face 110 spaces the through bore 134 a first distance D1 from the second abutment face 110 and engagement of the second spacer abutment 181 with the second abutment face 110 spaces the through bore 134 a second distance D2 from the second abutment face 110. This is because the spacer locating pins 184 are not centered between the first and second spacer abutments 180, 181. Instead, they are spaced different distances D1 and D2 from the pin axes 186.

In this embodiment, when switching between the two different spacings, the user switches which spacer locating pins 184 are located within which through bore 134. This is done by rotating the drill guide spacer 174 180 degrees. Other embodiments could use a different number of spacer locating pins 184. It is contemplated that a single spacer pin 184 could be used. In such an embodiment, using a rectangular spacer body 179, four different offset distances could be used if each side of the rectangular was spaced a different distance from the pin axis 186.

In one embodiment, typically, the outer diameter of the spacer locating pins 184 is configured to mate with the inner diameter of the through bores 134. In some embodiments, the outer diameter of the spacer locating pins 184 could be stepped to cooperate with different ones of the drill guides 103, 105, 107 and more particularly that the locating pins 184 can properly seat within the different diameters provided by the through bores 134 of the different drill guides 103, 105, 107.

In FIG. 4, the different drill guide spacers 170, 172, 174 each have two different abutments for allowing for using the spacers 170, 172, 174 to be able to provide two different spacings for the corresponding drill guides 103, 105, 107.

Figure 12:
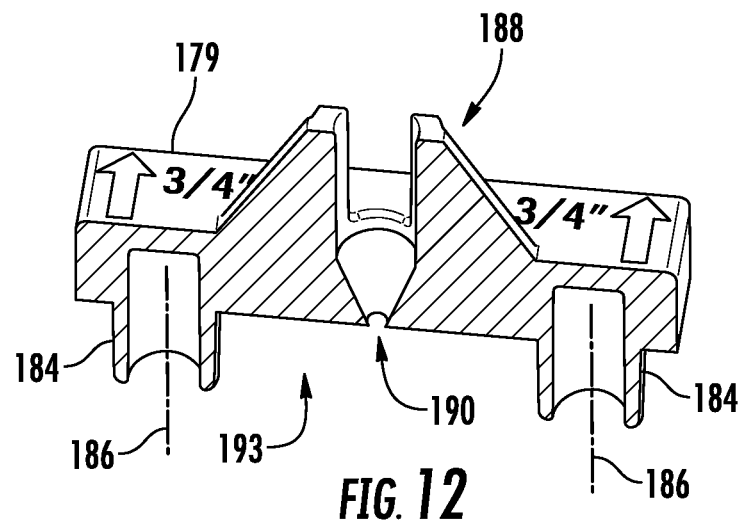
FIG. 12 is a perspective, cross-sectional illustration of the drill guide spacer used in FIGS. 5-11.
Figure 13:
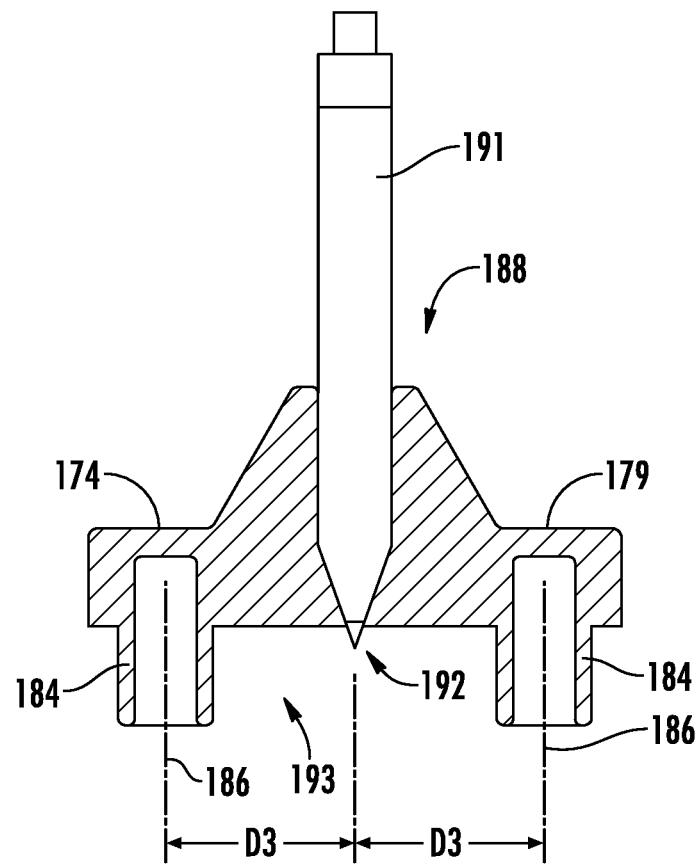
FIG. 13 is a cross-sectional illustration of the drill guide spacer of FIG. 12 with a marking device installed.

With reference to FIG. 12, a further difference of drill guide spacer 174 from the other two drill guide spacers 170, 172 is that the drill guide spacer 174 includes a marking device holder 188 that can hold a pencil, pen, chalk or other marking device 191. The holder has an opening 190 through which the tip 192 of the marking device 19. The opening 190 is located equally spaced between the pin axes 186 a distance D3 such that a user can use the drill guide spacer 174 to locate the center line of the thickness of a workpiece.

To find the centerline of a workpiece, the user would insert the workpiece between the pair locating pins 184. The user would rotate the drill guide spacer 174 until both locating pins 184 contact the opposed faces of the workpiece. This will automatically center the opening 190 and tip 192 between the opposed faces of the workpiece. The user can then slide the drill guide spacer 174 along the workpiece to mark a centerline between the opposed faces of the workpiece.

Preferably, the marking device holder 188 is sized to provide a friction fit with the corresponding marking device 191. In this embodiment, the marking device holder 188 has upstanding projections that are spaced apart that provides a cavity in which the marking device 191 is positioned. These projections may have some resilient flexibility to provide the desired friction fit.

Typically, mating workpieces must align in three dimensions. As such, in addition to the first and second abutment faces 108, 110, the dowel jig 100 includes first and second side stops 200, 202 for abutting and locating a third side of the workpiece as symbolized by arrow 203 in FIG. 14 (e.g. parallel to alignment axis 138 of the drill guides 103, 105, 107).

Figure 14:
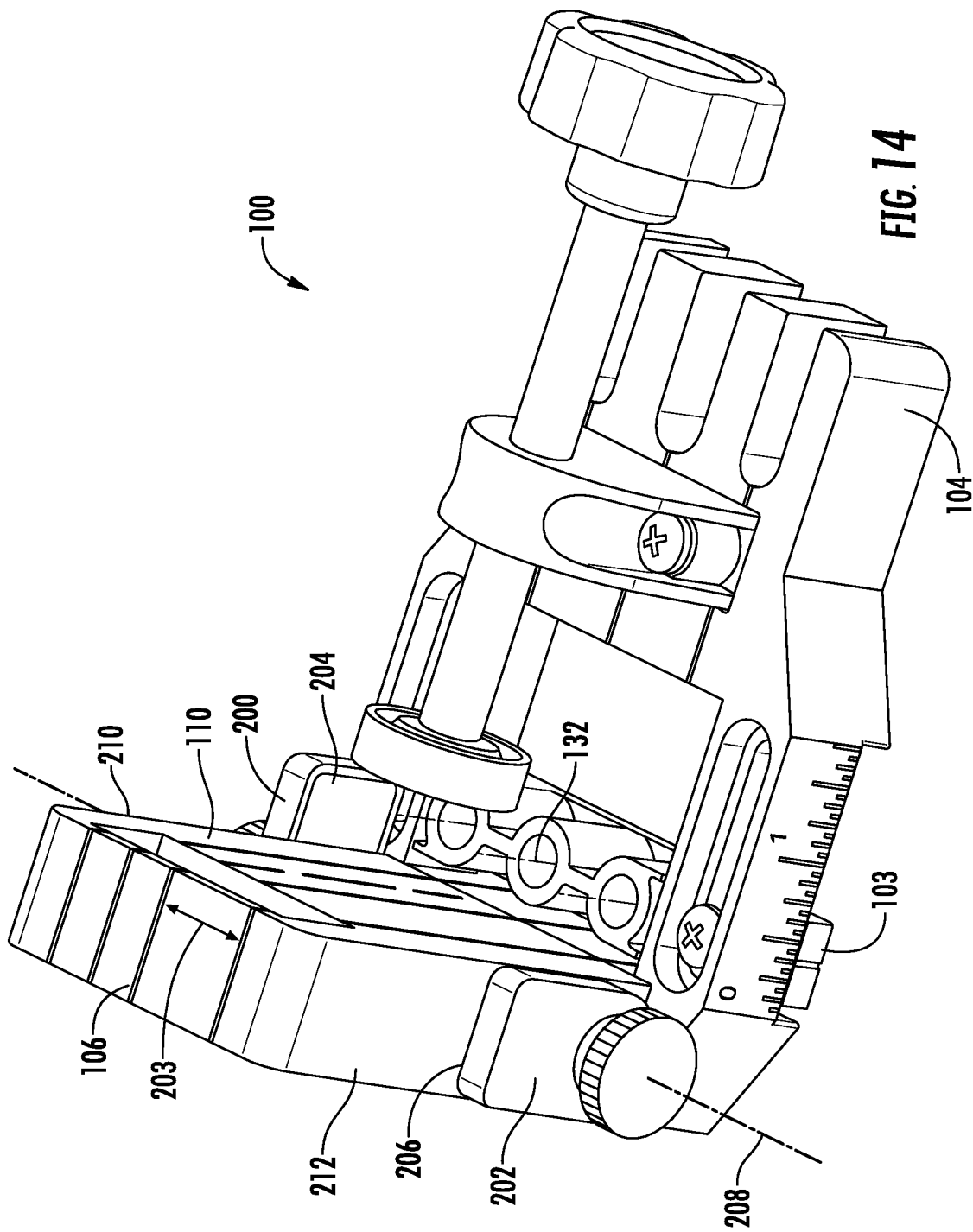
FIG. 14 is a perspective illustration showing a first side stop in an extended position and a second side stop in a retracted position.
Figure 15:
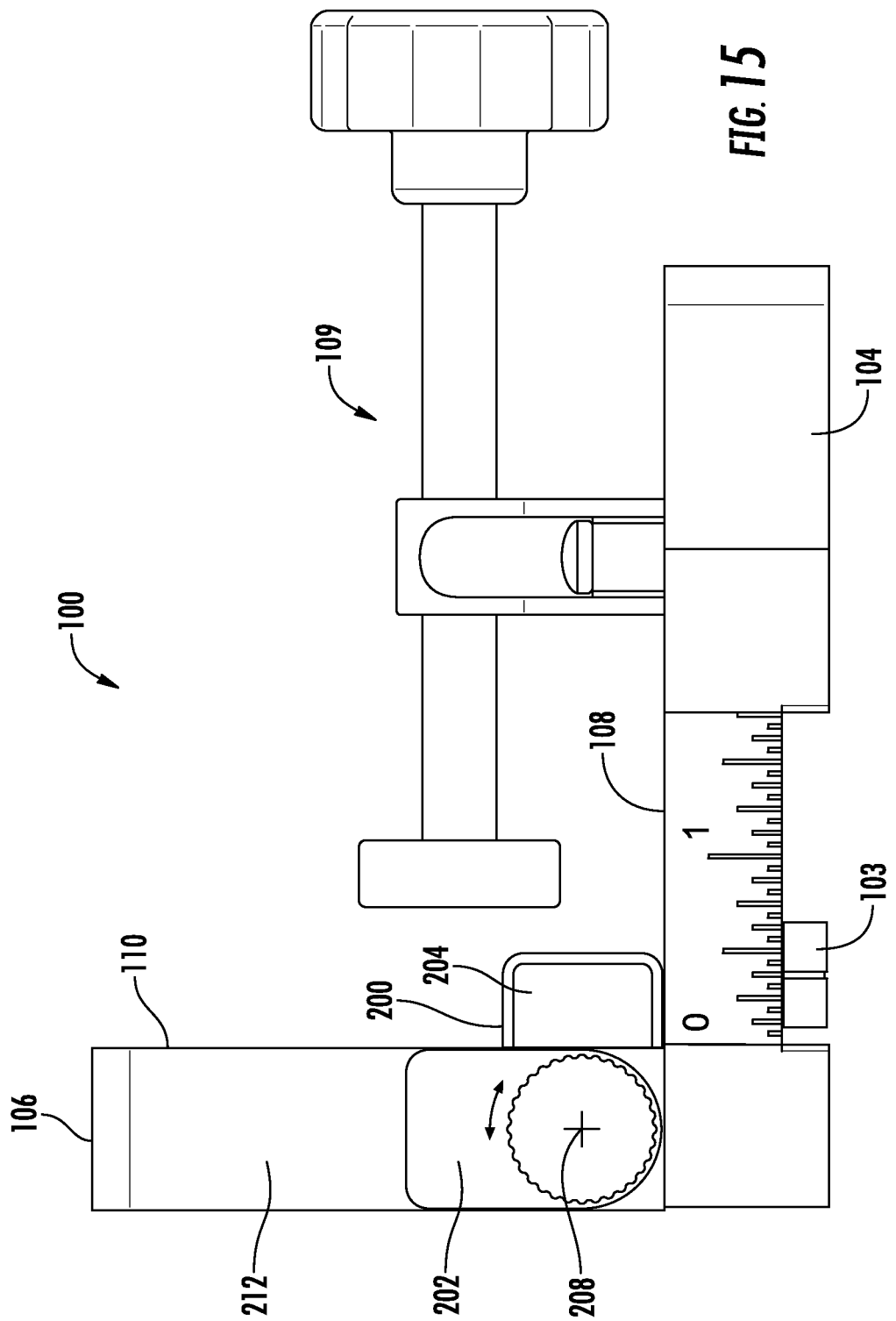
FIG. 15 is a side view of FIG. 14.

The side stops 200, 202 are adjustable between a retracted position (see e.g. side stop 202 in FIG. 14) and an extended position (see e.g. side stop 200 in FIG. 14).

In the retracted position, the side stops 200, 202 are positioned entirely rearward of or at most aligned with the second abutment plane. This allows for very wide workpieces to be, at appropriate times, positioned relative to the drill guides 103, 105, 107 with the workpiece extending beyond both sides of the first and second legs 104, 106.

In the extended position, the side stops 200, 202 extend forward of the second abutment plane and the second abutment face 110. This allows a workpiece to be abutted against the inner face 204, 206 of the side stops 200, 202. Typically, the inner face 204, 206 is spaced a distance equal to ½ the distance between adjacent through bores 134 of the drill guides 103, 105, 107.

In the illustrated example, the side stops 200, 202 are pivotally mounted to the second leg 106 for transitioning between the extended and retracted positions by way of knobs threaded into the sides of the second leg. Other embodiments could have the side stops 200, 202 slidable between the two positions. Further, in some embodiments, the side stops 200, 202 could be mounted to the first leg 104 rather than the second leg 106.

In this example, the side stops 200, 202 rotate about rotational axis 208 defined by attachment knobs 210 that secure the side stops 200, 202 to the sides 210, 212 of the second leg 106.

Figure 16:
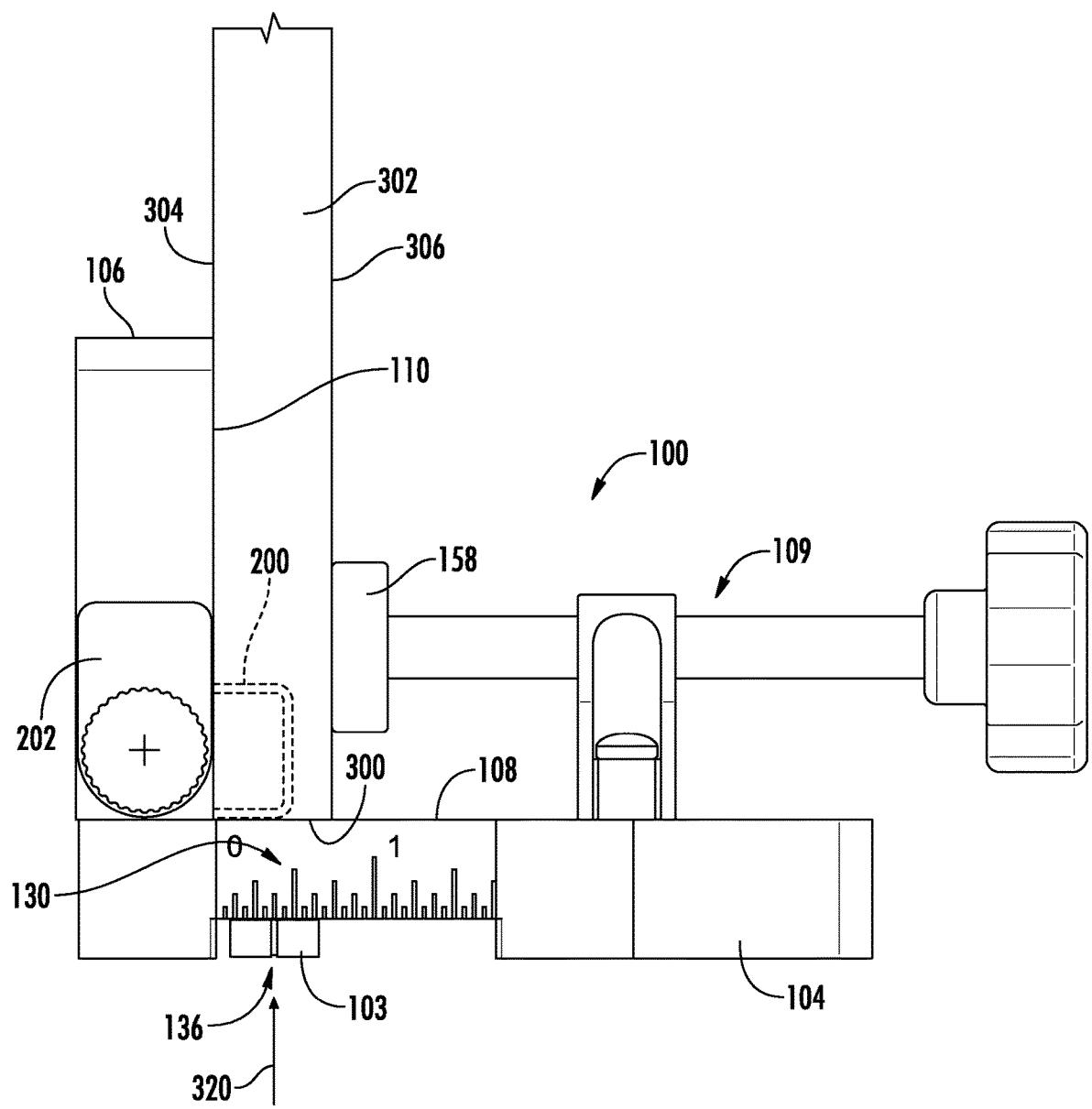
FIG. 16 is a side view of FIG. 15 with a workpiece clamped within the dowel jig.
Figure 17:
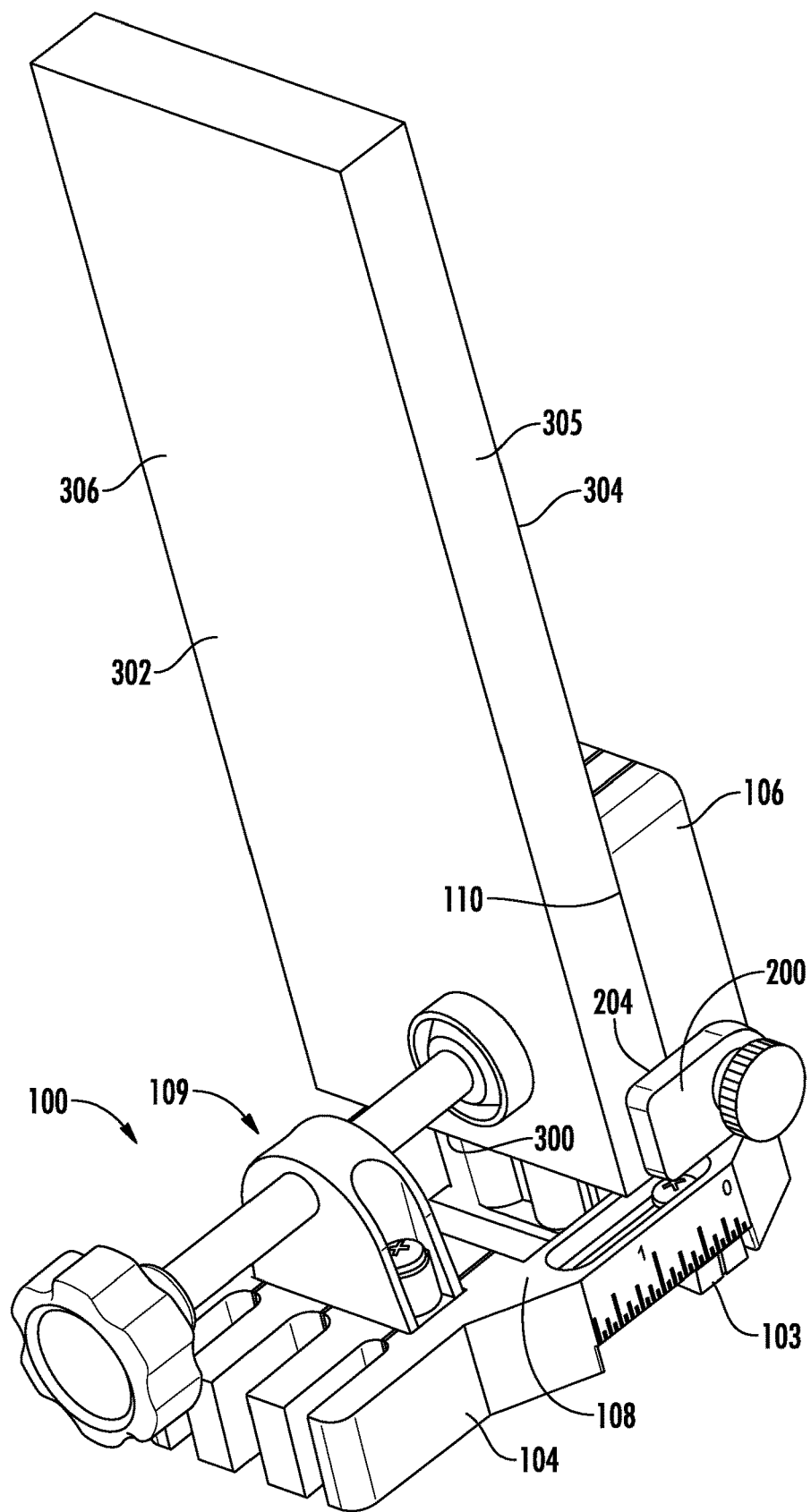
FIG. 17 is a perspective illustration of the dowel jig and workpiece of FIG. 16.

FIGS. 16 and 17 illustrate the dowel jig 100 configured to drill holes in an end 300 of workpiece 302. The thickness of the workpiece is ¾ inch and the drill guide 103 is centered on the thickness as illustrated by scale 130 and marker 136. The end 300 is located on first abutment face 108. A first face 304 of the workpiece 302 is in abutment with second abutment face 110. With reference to FIG. 17, side 305 of the workpiece 302 is in abutment with the first side stop 200 to properly locate the workpiece 302. Clamping head 158 of clamp assembly 109 presses on a second face 306 to fix the position of the workpiece 302. A user would drill the end 300 by guiding a drill bit from an opposite side of the first leg 104 as the first abutment face 108 as illustrated by arrow 320. The user can drill as many holes as provided by the drill guide 103 and as the width of the workpiece 302 will allow.

Figure 18:
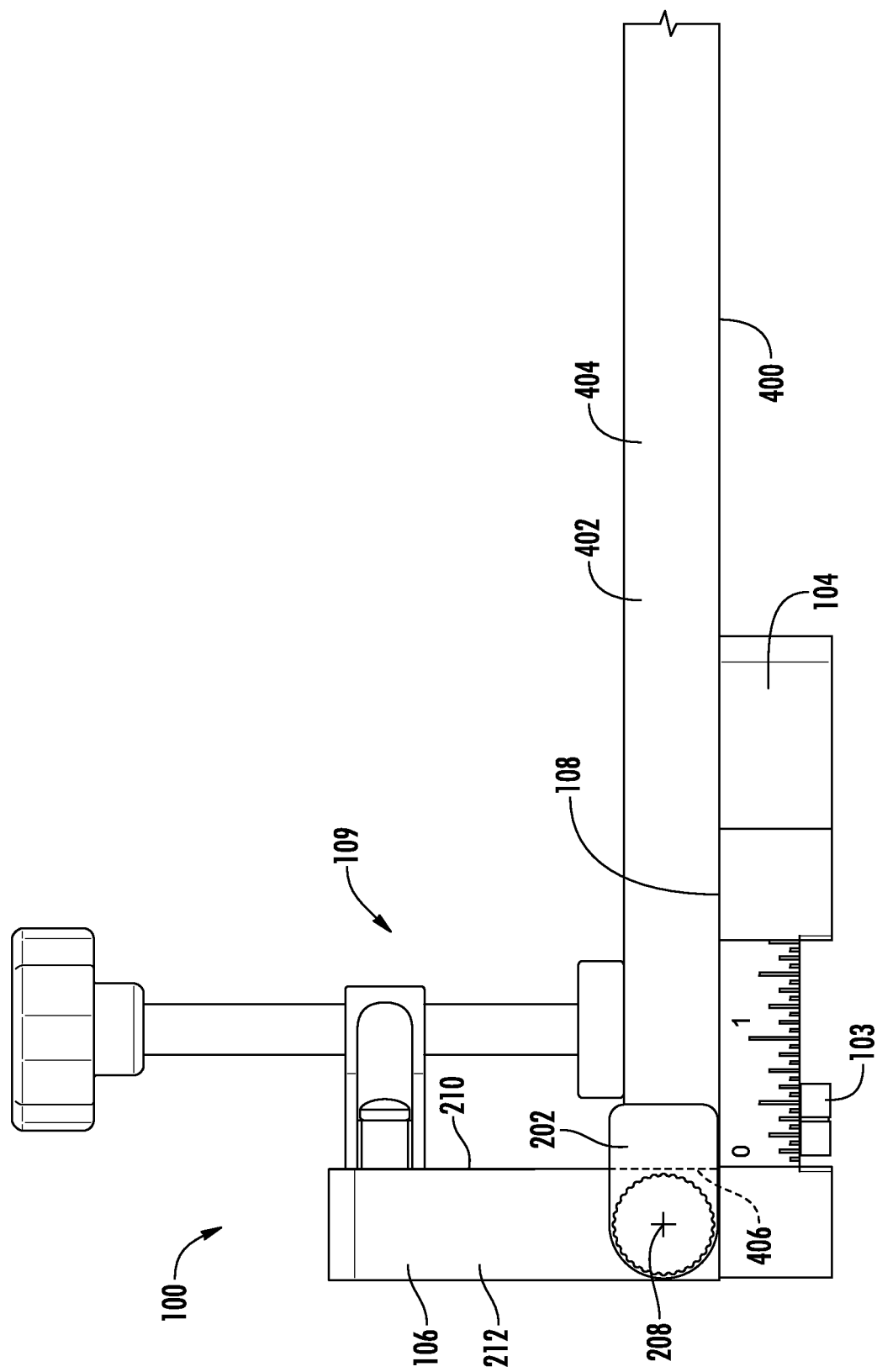
FIG. 18 is a side view of the dowel jig in a second configuration clamped to a second workpiece.
Figure 19:
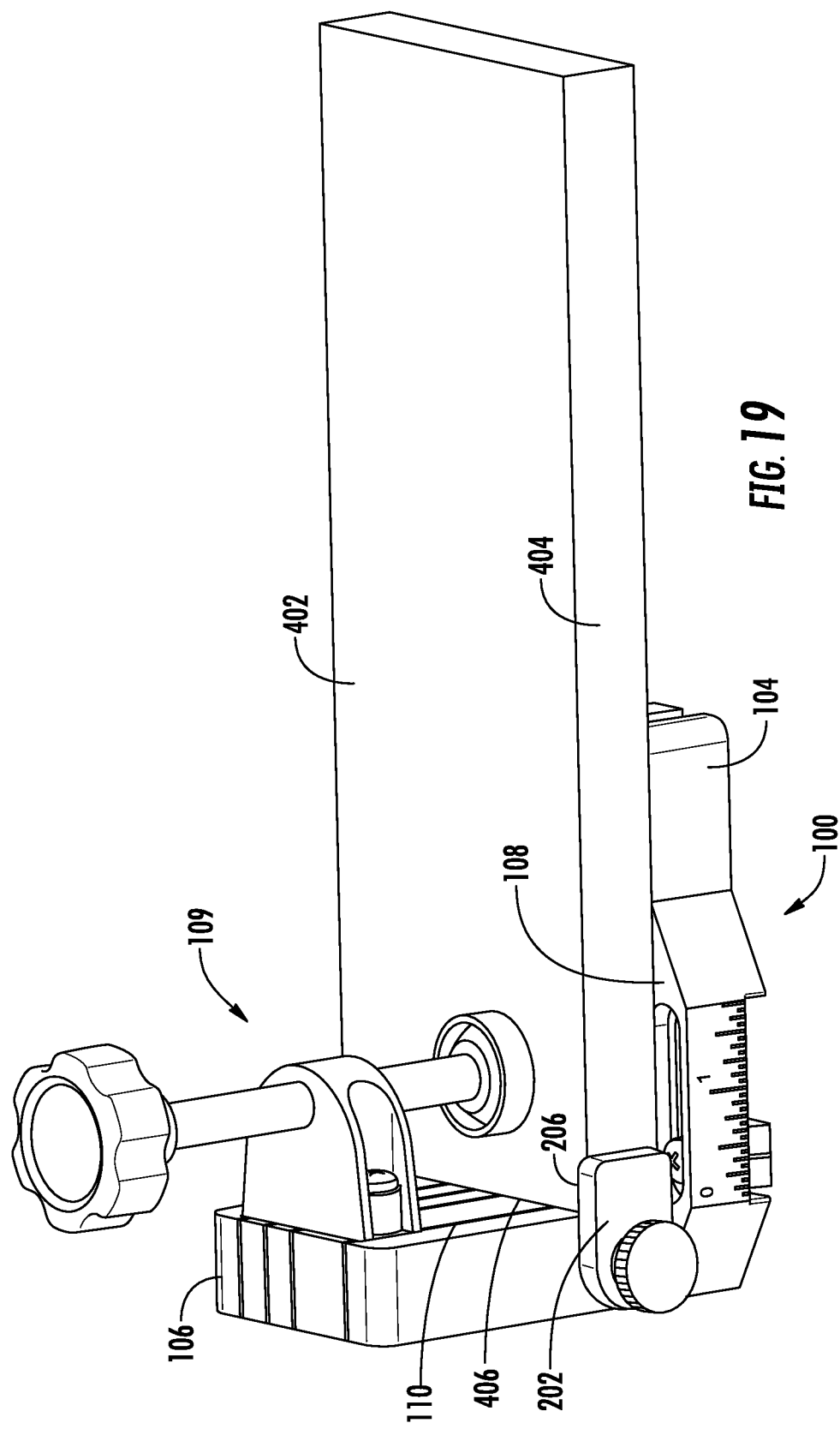
FIG. 19 is a perspective illustration of the dowel jig and workpiece of FIG. 18.

FIGS. 18 and 19 illustrate the dowel jig 100 being used to form holes in a first face 400 of a second workpiece 402. However, because the drilling occurs on the back side of the workpieces, this workpiece 402 is abutted with the second side stop 202 so that proper alignment of the first and second workpieces 302, 402 occurs when joined using dowel pins. More particularly, side 404 is positioned against second side stop 202, which is in the extended position. In this configuration, the width of the workpiece 402 is such that the first side stop 200 is transitioned to the retracted position.

In this configuration, the clamping assembly 109 has been moved and is now mounted to the second leg 106 rather than the first leg 104 such as for drilling the first workpiece 302 in FIG. 16.

First face 400 is abutted against the first abutment face 108 and an end 406 (illustrated by dashed lines) is abutted against the second abutment face 110.

FIG. 20 illustrates forming dowel holes in the middle of a first workpiece 500 to form a T-joint with second workpiece 600. The second workpiece 600 has already had a dowel hole 602 drilled in an end 604 thereof. A dowel 606 has been inserted into the dowel hole 602 with a portion extending therefrom. The first leg 104 engages the exposed end of dowel 606. The user can then drill a hole using through hole 134A of the drill guide 105 which will be spaced from the sides of workpiece 500 an equal distance as dowel 606 and dowel hold 602 are spaced from the sides of workpiece 600.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A dowel jig comprising:
  a main body having:
    a first leg providing a first workpiece abutment face, the first leg having a drill guide cavity proximate the first workpiece abutment face; and
    a second leg providing a second workpiece abutment face, the first workpiece abutment face being perpendicular to the second workpiece abutment face;
  a first side stop adjustably mounted to the second leg, the first side stop adjustable between a retracted position where the first side stop is positioned rearward of or aligned with a second abutment plane provided by the second abutment face and an extended position where the first side stop is positioned forward of the second abutment plane;
  a clamp assembly selectively mountable to the first leg and selectively mountable to the second leg, the clamp assembly having a clamping head movable towards and away from the second leg when the clamp assembly is mounted to the first leg, the clamping head being movable towards and away from the first leg when the clamp assembly is mounted to the second leg, the clamp assembly being positioned forward of the second abutment plane when the clamp is mounted to the first leg; and
  a drill guide mountable to the first leg within the drill guide cavity, the drill guide defining at least one through bore having a central axis that is orthogonal to the first workpiece abutment face and parallel to the second workpiece abutment face.

2. The dowel jig of claim 1, wherein the first side stop is pivotally mounted to a first side of the second leg for pivoting about a rotational axis that is parallel to the second abutment plane between the retracted and extended positions.

3. The dowel jig of claim 1, further including a second side stop adjustably mounted to the second leg, the second side stop adjustable between a retracted position where the second side stop is positioned rearward of or aligned with the second abutment plane provided by the second workpiece abutment face and an extended position where the second side stop is positioned forward of the second abutment plane.

4. The dowel jig of claim 3, wherein the first and second side stops are mounted on opposed sides of the second leg, the second leg being positioned between the first and second side stops.

5. The dowel jig of claim 1, wherein the first side stop defines a third abutment face, a workpiece being able to abut the third abutment face when the first side stop is in the extended state and the workpiece is abutted against the first and second abutment faces.

6. The dowel jig of claim 1, wherein, when mounted to the first leg within the drill guide cavity, the drill guide is recessed into the first leg beyond the first abutment face or flush with the first abutment face and does not project outward beyond the first abutment face.

7. A dowel jig comprising:
  a main body having:
    a first leg providing a first workpiece abutment face, the first leg having a drill guide cavity proximate the first workpiece abutment face; and
    a second leg providing a second workpiece abutment face, the first workpiece abutment face being perpendicular to the second workpiece abutment face;
  a drill guide adjustably mountable to the first leg within the drill guide cavity, the drill guide defining at least one through bore having a central axis that is orthogonal to the first workpiece abutment face and parallel to the second workpiece abutment face, the adjustable mounting of the drill guide permitting the through bore to be mounted at different distances spaced away from the second workpiece piece abutment face;

a drill guide spacer having:
a spacer body having a first spacer abutment and a second spacer abutment; and
a spacer locating pin extending from the spacer body defining a pin axis, the spacer locating pin sized to be received in the at least one through bore of the drill guide, the first spacer abutment spaced a first distance from the pin axis such that engagement of the first spacer abutment with the second abutment face spaces the through bore of the drill guide a first distance from the second abutment face when the spacer locating pin is within the at least one through bore, the second spacer abutment spaced a second distance from the pin axis such that engagement of the second spacer abutment with the second abutment face spaces the through bore of the drill guide a second distance from the second abutment face when the spacer locating pin is within the at least one through bore, the second distance being different than the first distance.

8. The dowel jig of claim 7, wherein the first spacer abutment is a first planar side of the spacer body and the second spacer abutment is a second planar side of the spacer body, the first and second planar sides are parallel to one another and face away from one another with the spacer locating pin being positioned therebetween.

9. The dowel jig of claim 7, wherein:
the drill guide includes at least two through bores including a first through bore and a second through bore, each through bore of the at least two through bores defining a central axis, the central axes of the at least two through bores being aligned along an alignment axis, the alignment axis being parallel to the second abutment face;
the drill guide spacer has first and second spacer locating pins;
the first pin is received in the first through bore and the second pin is received in the second through bore when the first spacer abutment engages the second abutment face to offset the first and second through bores of the drill guide a first distance from the second abutment face; and
the first pin is received in the second through bore and the second pin is received in the first through bore when the second spacer abutment engages the second abutment face to offset the first and second through bores of the drill guide a second distance from the second abutment face, the second distance being different than the first distance.

10. The dowel jig of claim 7, further comprising:
a second drill guide adjustably mountable to the first leg within the drill guide cavity, the second drill guide defining at least one through bore having a diameter that is greater than a diameter of the first drill guide, the at least one through bore having a central axis that is orthogonal to the first workpiece abutment face and parallel to the second workpiece abutment face, the adjustable mounting of the drill guide permitting the through bore to be mounted at different distances spaced away from the second workpiece piece abutment face;
a second drill guide spacer having:
a second spacer body having a third spacer abutment and a fourth spacer abutment; and
a third spacer locating pin extending from the second spacer body defining a second pin axis, the spacer locating pin having a diameter sized to be received in the at least one through bore of the second drill guide but being larger than the diameter of the through bore of the first drill guide, the third spacer abutment spaced a third distance from the second pin axis such that engagement of the third spacer abutment with the second abutment face spaces the through bore of the second drill guide a third distance from the second abutment face when the third spacer locating pin is within the at least one through bore of the second drill guide, the fourth spacer abutment spaced a fourth distance from the second pin axis such that engagement of the fourth spacer abutment with the second abutment face spaces the through bore of the second drill guide a fourth distance from the second abutment face when the third spacer locating pin is within the at least one through bore of the second drill guide, the fourth distance being different than the third distance.

11. The dowel jig of claim 7, wherein the drill guide spacer has two spaced apart locating pins extending from the spacer body defining an offset axis therebetween, the spacer body further including a marking bore positioned between the two spaced apart locating pins, the marking bore defining a marking bore central axis that is located on the offset axis and that is positioned at a midpoint between the two spaced apart locating pins.

12. A dowel jig comprising:
a main body having:
a first leg providing a first workpiece abutment face, the first leg having a drill guide cavity proximate the first workpiece abutment face, the first leg having a first clamp mounting recess; and
a second leg providing a second workpiece abutment face, the first workpiece abutment face being perpendicular to the second workpiece abutment face, the second leg having a second clamp mounting recess, the first and second clamp mounting recesses having a same cross-sectional shape and size:
a clamp assembly having a clamping head mounted to a mounting block, the clamping head movable relative to the mounting block, the mounting block having a base region having a same cross-sectional shape as the first and second clamp mounting recesses and sized to fit within the first and second clamp mounting recesses, the clamp assembly selectively mountable to the first leg with the base region received in the first clamp mounting recess, the clamp assembly selectively mountable to the second leg with the base region received in the second clamp mounting recess, the clamping head movable towards and away from the second leg when the clamp assembly is mounted to the first leg, the clamping head being movable towards and away from the first leg when the clamp assembly is mounted to the second leg, and
a drill guide mountable to the first leg within the drill guide cavity, the drill guide defining at least one through bore having a central axis that is orthogonal to the first workpiece abutment face and parallel to the second workpiece abutment face.

13. The dowel jig of claim 12, wherein the size of the base region mates with the first and second clamp mounting recesses.

14. The dowel jig of claim 12 further including at least one fastener that releasably secures the mounting block within the first clamp mounting recess when mounted to the first leg and releasably secures the mounting block within the second clamp mounting recess when mounted to the second leg.

15. The dowel jig of claim 12, wherein:
the first workpiece abutment face defines a first workpiece abutment plane against which a workpiece abuts, the first clamp mounting recess extends into the first leg beyond the first workpiece abutment plane; and
the second workpiece abutment face defines a second workpiece abutment plane against which the workpiece abuts, the second clamp mounting recess extends into the second leg beyond the first workpiece abutment plane.

* * * * *